(12) United States Patent
Lin et al.

(10) Patent No.: US 11,211,840 B2
(45) Date of Patent: Dec. 28, 2021

(54) WINDING STRUCTURE OF MOTOR STATOR

(71) Applicant: LIDASHI INDUSTRY CO., LTD., Taoyuan (TW)

(72) Inventors: Yung-Yu Lin, Taoyuan (TW); Ching-Hui Hsu, Taoyuan (TW); Jui-Yang Hsu, Taoyuan (TW)

(73) Assignee: LIDASHI INDUSTRY CO., LTD., Taoyuan (TW)

( * ) Notice: Subject to any disclaimer, the term of this patent is extended or adjusted under 35 U.S.C. 154(b) by 109 days.

(21) Appl. No.: 16/848,673

(22) Filed: Apr. 14, 2020

(65) Prior Publication Data

US 2021/0320538 A1    Oct. 14, 2021

(51) Int. Cl.
| | |
|---|---|
| *H02K 3/34* | (2006.01) |
| *H02K 3/487* | (2006.01) |
| *H02K 3/32* | (2006.01) |
| *H02K 3/493* | (2006.01) |
| *H02K 1/14* | (2006.01) |

(52) U.S. Cl.
CPC ............ *H02K 3/345* (2013.01); *H02K 3/325* (2013.01); *H02K 3/34* (2013.01); *H02K 3/487* (2013.01); *H02K 3/493* (2013.01); *H02K 1/146* (2013.01)

(58) Field of Classification Search
CPC .......... H02K 1/146; H02K 3/325; H02K 3/34; H02K 3/345; H02K 3/487; H02K 3/493; H02K 3/28; H02K 3/522; H02K 3/38; H02K 3/46; H02K 1/148; H02K 1/04; H02K 3/50
USPC .................................. 310/214, 215, 216.058
See application file for complete search history.

(56) References Cited

U.S. PATENT DOCUMENTS

| | | | | |
|---|---|---|---|---|
| 8,917,006 | B2* | 12/2014 | Jang ...................... | H02K 3/522 310/215 |
| 2011/0273053 | A1* | 11/2011 | Oka ....................... | H02K 3/522 310/215 |
| 2013/0140936 | A1* | 6/2013 | Lin ........................ | H02K 3/325 310/215 |

(Continued)

FOREIGN PATENT DOCUMENTS

| | | |
|---|---|---|
| TW | M379925 | 5/2010 |
| TW | M424702 | 3/2012 |

(Continued)

OTHER PUBLICATIONS

Zhang Xu, Motor Stator Structure, Jun. 30, 2011, Zhongshan Broad-Ocean Motor Manufacture Co. Ltd., WO 2011076027 (English Machine Translation) (Year: 2011).*

*Primary Examiner* — Quyen P Leung
*Assistant Examiner* — Alexander A Singh
(74) *Attorney, Agent, or Firm* — Muncy, Geissler, Olds & Lowe, P.C.

(57) ABSTRACT

A winding structure of motor stator includes a stator core, two insulation members, an upper cap, a lower cap, and a coil. The two insulation members are disposed on two winding grooves of the stator core respectively. The upper cap and the lower cap are disposed on a top end and a bottom end of the stator core respectively. The coil is wound on the upper cap, the two insulation members, and the lower cap. Stopping pieces facing each other are formed on two sides of each of the upper cap and the lower cap. Each of the stopping pieces is separated from the coil without contact.

9 Claims, 5 Drawing Sheets

(56) References Cited

U.S. PATENT DOCUMENTS

2020/0052539 A1* 2/2020 Hsu .................. H02K 3/522

FOREIGN PATENT DOCUMENTS

TW              I671976         9/2019
WO    WO-2011076027  A1 *  6/2011   ............. H02K 3/522

* cited by examiner

WINDING STRUCTURE OF MOTOR STATOR

BACKGROUND OF THE INVENTION

Field of the Invention

The present invention relates to a motor stator, especially to a winding structure of motor stator.

Description of the Prior Art

A motor stator is composed of a plurality of stator members arranged annularly. Each of the stator members is composed of a stator core, an insulation layer covering the stator core, and a coil winding the insulation layer, as shown in patents TW M424702, TW M379925, and TW 1671976.

However, the winding space of the stator members mentioned above usually opens completely. That is, the coil may loosen during winding. Besides, no wire groove is formed on the winding groove, or the wire grooves are parallel to the winding groove. When the wire is winding, different layers of the wire have to extend nonparallel to be difficult to wind on the conventional wire grooves.

SUMMARY OF THE INVENTION

The main object of the present invention is to provide a winding structure of motor stator to prevent the wire from loosening during winding. In addition, the wire can be arranged better to prevent from being compressed.

To achieve the above and other objects, the winding structure of motor stator of the present invention includes a stator core, two insulation members, an upper cap, a lower cap, and a coil.

The stator core defines a longitudinal direction and a horizontal direction perpendicular to the longitudinal direction. Two ends of the stator core along the longitudinal direction are a top end and a bottom end. The stator core is formed with two winding grooves at two ends thereof along the horizontal direction.

The two winding grooves open toward opposite directions. Each of two sides of each of the winding grooves has a lateral wall so that a horizontal cross-section of each of the winding grooves is U-shaped.

A horizontal cross-section of each of the insulation members is U-shaped. Each of the insulation members has a contour corresponding to a shape of each of the winding grooves. The two insulation member are received in the two winding grooves respectively and contact surfaces of the winding grooves.

A top portion of the upper cap is formed with an upper receiving groove which opens upward. A first lateral wall and a second lateral wall are formed at two sides of a bottom of the upper receiving groove. Each of two ends of the first lateral wall along the horizontal direction extends toward the second lateral wall to form a first stopping piece. Each of the first stopping pieces is separated from the bottom of the upper receiving groove. Each of two ends of the second lateral wall along the horizontal direction extends toward the first lateral wall to form a second stopping piece. Each of the second stopping pieces is separated from the bottom of the upper receiving groove. The upper cap is disposed on the top end of the stator core. The first lateral wall and the second lateral wall connect to tops of the lateral walls of the two winding grooves.

A bottom portion of the lower cap is formed with a lower receiving groove which opens downward. A third lateral wall and a fourth lateral wall are formed at two sides of a bottom of the lower receiving groove. Each of two ends of the third lateral wall along the horizontal direction extends toward the fourth lateral wall to form a third stopping piece. Each of the third stopping pieces is separated from the bottom of the lower receiving groove. Each of two ends of the fourth lateral wall along the horizontal direction extends toward the third lateral wall to form a fourth stopping piece. Each of the fourth stopping pieces is separated from the bottom of the lower receiving groove. The lower cap is disposed on the bottom end of the stator core. The third lateral wall and the fourth lateral wall connect to bottoms of the lateral walls of the two winding grooves.

The coil is formed by a wire winding on bottoms of the insulation members, the bottom of the upper receiving groove, and the bottom of the lower receiving groove. The coil includes a plurality of loops of the wire. The coil is spacedly separated from the first stopping pieces, the second stopping pieces, the third stopping pieces, and the fourth stopping pieces.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
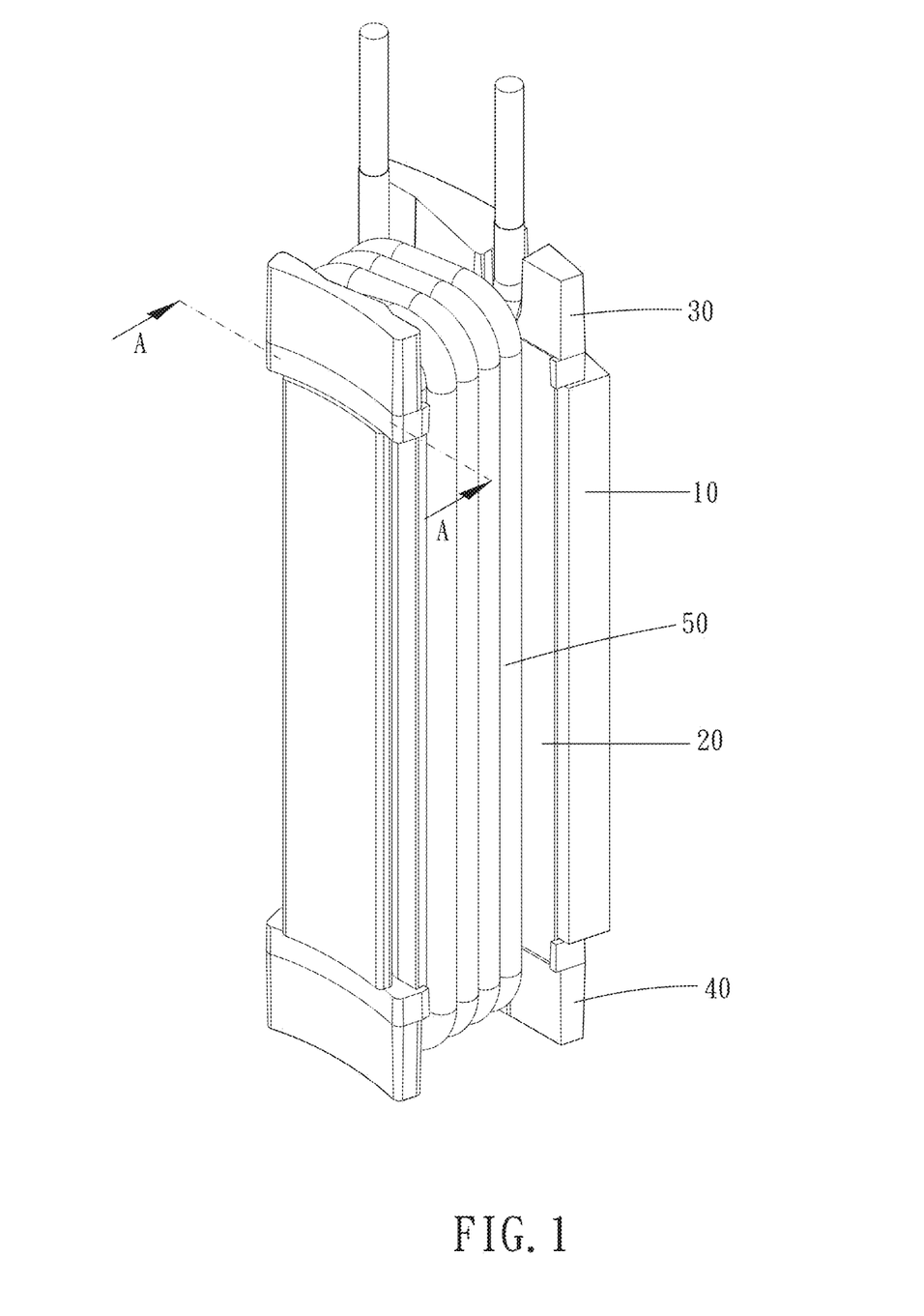
FIG. 1 is a stereogram of the present invention.
Figure 2:
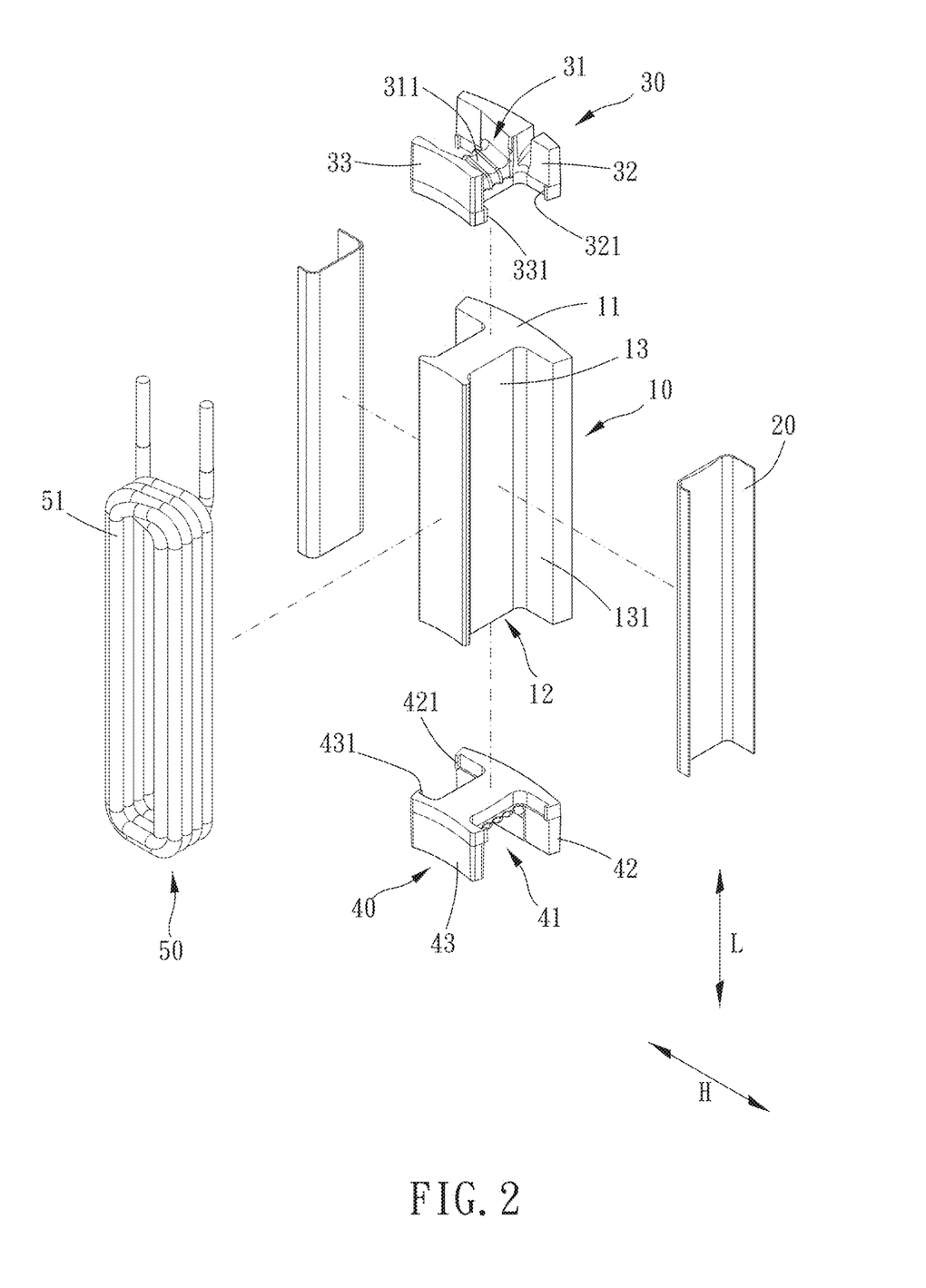
FIG. 2 is a breakdown drawing of the present invention.
Figure 3:
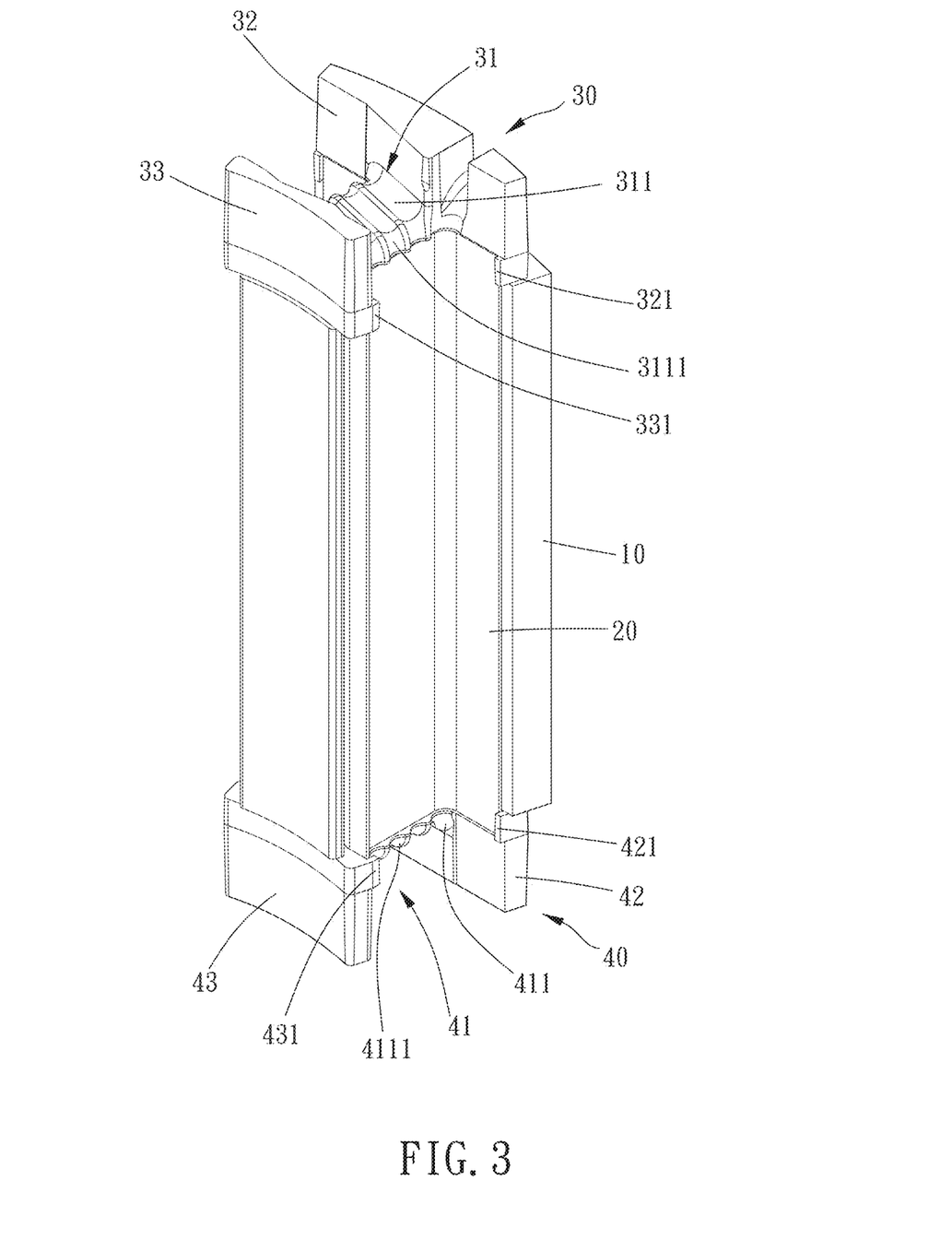
FIG. 3 is a stereogram of the present invention without a coil.
Figure 4:
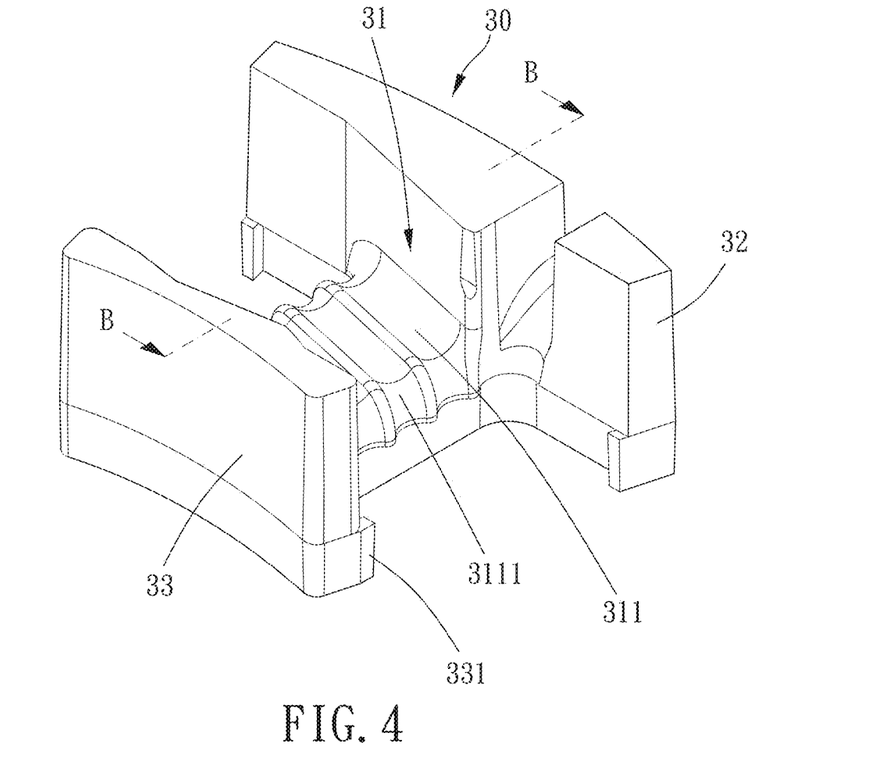
FIG. 4 is a stereogram showing an upper cap of the present invention.
Figure 5:
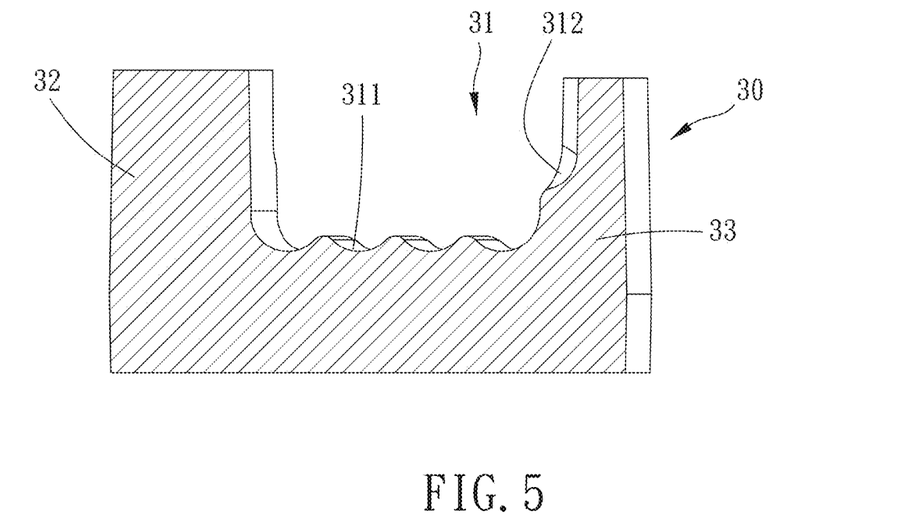
FIG. 5 is B-B cross-section.
Figure 6:
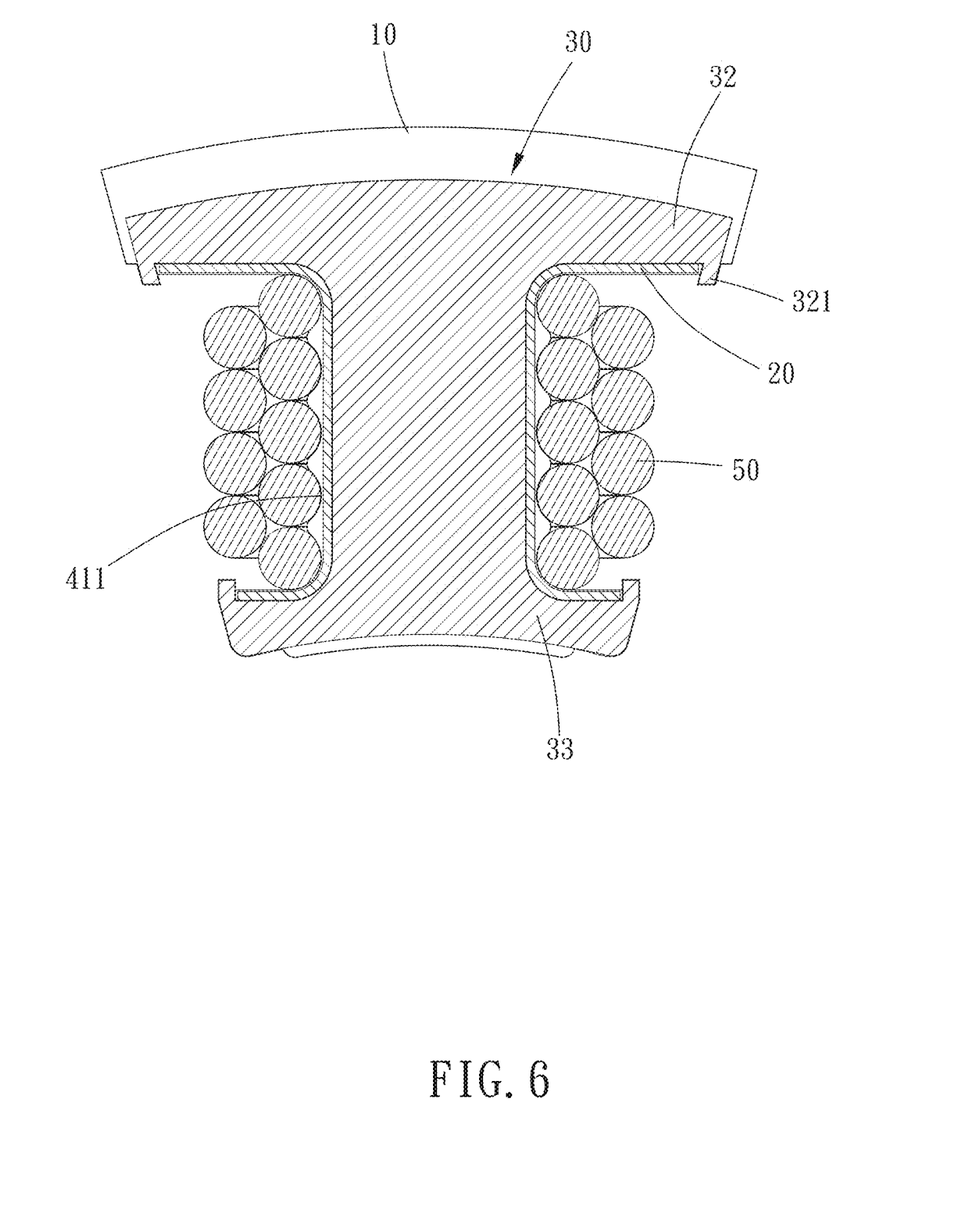
FIG. 6 is A-A cross-section.

Please refer to FIG. 1 to FIG. 6, the winding structure of motor stator of the present invention includes a stator core 10, two insulation members 20, an upper cap 30, a lower cap 40, and a coil 50.

The stator core 10 defines a longitudinal direction L and a horizontal direction H perpendicular to the longitudinal direction L. Two ends of the stator core 10 along the longitudinal direction L are a top end 11 and a bottom end 12. The stator core 10 is formed with two winding grooves 13 at two ends thereof along the horizontal direction. The two winding grooves 13 open toward opposite directions. Each of two sides of each of the winding grooves 13 has a lateral wall 131 so that a horizontal cross-section of each of the winding grooves 13 is U-shaped.

Each of the insulation members 20 is a plate. A horizontal cross-section of each of the insulation members 20 is U-shaped. Each of the insulation members 20 has a contour corresponding to a shape of each of the winding grooves 13. The two insulation member 20 are received in the two winding grooves 13 respectively and contact surfaces of the winding grooves 13.

A top portion of the upper cap 30 is formed with an upper receiving groove 31 which opens upward. A first lateral wall 32 and a second lateral wall 33 are formed at two sides of a bottom of the upper receiving groove 31. Each of two ends of the first lateral wall 32 along the horizontal direction H extends toward the second lateral wall 33 to form a first stopping piece 321. Each of the first stopping pieces 321 is separated from the bottom of the upper receiving groove 31. Each of two ends of the second lateral wall 33 along the horizontal direction H extends toward the first lateral wall 32 to form a second stopping piece 331. Each of the second stopping pieces 331 is separated from the bottom of the upper receiving groove 31. The upper cap 30 is disposed on the top end 11 of the stator core 10. The first lateral wall 32 and the second lateral wall 33 connect to tops of the lateral walls 131 of the two winding grooves 13.

A bottom portion of the lower cap 40 is formed with a lower receiving groove 41 which opens downward. A third lateral wall 42 and a fourth lateral wall 43 are formed at two sides of a bottom of the lower receiving groove 41. Each of two ends of the third lateral wall 42 along the horizontal direction H extends toward the fourth lateral wall 43 to form a third stopping piece 421. Each of the third stopping pieces 421 is separated from the bottom of the lower receiving groove 41. Each of two ends of the fourth lateral wall 43 along the horizontal direction H extends toward the third lateral wall 42 to form a fourth stopping piece 431. Each of the fourth stopping pieces 431 is separated from the bottom of the lower receiving groove 41. The lower cap 40 is disposed on the bottom end 12 of the stator core 10. The third lateral wall 42 and the fourth lateral wall 43 connect to bottoms of the lateral walls 131 of the two winding grooves 13.

The coil 50 is formed by a wire 51 winding on bottoms of the insulation members 20, the bottom of the upper receiving groove 31, and the bottom of the lower receiving groove 41. The coil 50 includes a plurality of loops of the wire 51. The coil 50 is spacedly separated from the first stopping pieces 321, the second stopping pieces 331, the third stopping pieces 421, and the fourth stopping pieces 431. Preferably, two ends of each of the insulation members 20 along the longitudinal direction L extend to the upper cap 30 and the lower cap 40 respectively to be protected by the first stopping piece 321, the second stopping piece 331, the third stopping piece 421, and the fourth stopping piece 431 along the horizontal direction H.

Specifically, a plurality of upper grooves 311 are formed on the bottom of the upper receiving groove 31. The upper grooves 311 are parallel arranged and are substantially parallel to the horizontal direction H. A plurality of lower grooves 411 are formed on the bottom of the lower receiving groove 41. The lower grooves 411 are parallel arranged and are substantially parallel to the horizontal direction H. Preferably, a longitudinal cross-section of each of the upper grooves 311 is recessed arc-shaped, and a longitudinal cross-section of each of the lower grooves 411 is also recessed arc-shaped. That is, each of the upper grooves 311 or the lower grooves 411 can support the bottom and two sides of the wire 51, and also positions the wire 51. In addition, the upper grooves 311 and the lower grooves 411 facilitates the winding of the coil 50. More preferably, each of the first stopping pieces 321 at least partially overlaps at least one of the upper grooves 311 along the horizontal direction H. Each of the second stopping pieces 331 at least partially overlaps at least one of the upper grooves 31 along the horizontal direction H. Each of the third stopping pieces 421 at least partially overlaps at least one of the lower grooves 41 along the horizontal direction H. Each of the fourth stopping pieces 431 at least partially overlaps at least one of the lower grooves 41 along the horizontal direction H. The stopping pieces are located in front of the upper grooves and the lower grooves so as to prevent the wire from loosening. Besides, two ends of each of the upper grooves 311 obliquely extend downward to form chamfers 3111 at two ends thereof along the horizontal direction H. Two ends of each of the lower grooves 411 obliquely extend upward to form chamfers 4111 at two ends thereof along the horizontal direction H. Thereby, the chamfers 3111, 4111 can guide the wire 51 to wind, and the wire 51 is avoided from damaging at the corners.

More preferably, the upper receiving groove 31 further has an elongated stepped groove 312 therein. The stepped groove 312 is formed on one of the first lateral wall 32 and the second lateral wall 33. The stepped groove 312 extends along a direction nonparallel to an extending direction of the upper grooves 311. A bottom of the stepped groove 312 is higher than bottoms of the upper grooves 311. A longitudinal cross-section of the bottom of the stepped groove 312 is recessed arc-shaped. A depth of the stepped groove 312 is increasing toward the upper grooves 311. Besides, the coil 50 includes two layers of the wire 51. The two layers of the wire 51 extend along two nonparallel directions respectively in the upper receiving groove 311. Thereby, the first row of the wire 51 of the upper layer of the wire 51 can lean against the stepped groove 312 so that the first row of the wire 51 of the upper layer of the wire 51 is located at an outside of the first row of the wire 51 of the lower layer of the wire 51.

In view of the stopping pieces, the two first stopping pieces 321 are located at an end of the first lateral wall 32 closer to the stator core 10. The two second stopping pieces 331 are located at an end of the second lateral wall 33 closer to the stator core 10. The two third stopping pieces 421 are located at an end of the third lateral wall 42 closer to the stator core 10. The two fourth stopping pieces 431 are located at an end of the fourth lateral wall 43 closer to the stator core 10. Specifically, a minimum distance between each of the first stopping pieces 321 and the coil 50 is 0.5-1.0 time a diameter of the wire 51. A minimum distance between each of the second stopping pieces 331 and the coil 50 is 0.3-0.8 time the diameter of the wire 51. A minimum distance between each of the third stopping pieces 421 and the coil 50 is 0.5-1.0 time the diameter of the wire 51. A minimum distance between each of the fourth stopping pieces 431 and the coil 50 is 0.3-0.8 time the diameter of the wire 51. Besides, a distance between each of the first stopping pieces 321 and the second stopping piece 331 corresponding to it is 12-17 times a length of each of the first stopping pieces 321 extending from the first lateral wall 32. A distance between each of the first stopping pieces 321 and the second stopping piece 331 corresponding to it is 12-17 times a length of each of the second stopping pieces 331 extending from the second lateral wall 33. A distance between each of the third stopping pieces 421 and the fourth stopping piece 431 corresponding to it is 12-17 times a length of each of the third stopping pieces 421 extending from the third lateral wall 42. A distance between each of the third stopping pieces 421 and the fourth stopping piece 431 corresponding to it is 12-17 times a length of each of the fourth stopping pieces 431 extending from the fourth lateral wall 43. Thereby, the wire is easy to enter the winding space but not hindered by the stopping pieces. However, the wire is prevented from loosening when winding.

In conclusion, the winding structure of motor stator of the present invention is assembled by a plurality of members so that the design of the winding structure is easy to change. The stopping pieces can position the insulation members and prevent the wire from loosening when winding the coil. However, the wire is still easy to wind. Besides, the upper grooves and the lower grooves have arc-shaped cross-section so as to support the wire better. Thus, the wire is prevented from compressing.

What is claimed is:

1. A winding structure of motor stator, including:
a stator core, defining a longitudinal direction and a horizontal direction perpendicular to the longitudinal direction, two ends of the stator core along the longitudinal direction being a top end and a bottom end, the stator core being formed with two winding grooves at two ends thereof along the horizontal direction, the two winding grooves opening toward opposite directions, each of two sides of each of the winding grooves having a lateral wall so that a horizontal cross-section of each of the winding grooves is U-shaped;
two insulation members, a horizontal cross-section of each of the insulation members being U-shaped, each of the insulation members having a contour corresponding to a shape of each of the winding grooves, the two insulation member being received in the two winding grooves respectively and contacting surfaces of the winding grooves;
an upper cap, a top portion of the upper cap being formed with an upper receiving groove which opens upward, a first lateral wall and a second lateral wall being formed at two sides of a bottom of the upper receiving groove, each of two ends of the first lateral wall along the horizontal direction extending toward the second lateral wall to form a first stopping piece, each of the first stopping pieces being separated from the bottom of the upper receiving groove, each of two ends of the second lateral wall along the horizontal direction extending toward the first lateral wall to form a second stopping piece, each of the second stopping pieces being separated from the bottom of the upper receiving groove, the upper cap being disposed on the top end of the stator core, the first lateral wall and the second lateral wall connecting to tops of the lateral walls of the two winding grooves;
a lower cap, a bottom portion of the lower cap being formed with an lower receiving groove which opens downward, a third lateral wall and a fourth lateral wall being formed at two sides of a bottom of the lower receiving groove, each of two ends of the third lateral wall along the horizontal direction extending toward the fourth lateral wall to form a third stopping piece, each of the third stopping pieces being separated from the bottom of the lower receiving groove, each of two ends of the fourth lateral wall along the horizontal direction extending toward the third lateral wall to form a fourth stopping piece, each of the fourth stopping pieces being separated from the bottom of the lower receiving groove, the lower cap being disposed on the bottom end of the stator core, the third lateral wall and the fourth lateral wall connecting to bottoms of the lateral walls of the two winding grooves; and
a coil, being formed by a wire winding on bottoms of the insulation members, the bottom of the upper receiving groove, and the bottom of the lower receiving groove, the coil including a plurality of loops of the wire;
wherein the coil is spacedly separated from the first stopping pieces, the second stopping pieces, the third stopping pieces, and the fourth stopping pieces.

2. The winding structure of motor stator of claim 1, wherein a plurality of upper grooves are formed on the bottom of the upper receiving groove, the upper grooves are parallel arranged and are substantially parallel to the horizontal direction, a plurality of lower grooves are formed on the bottom of the lower receiving groove, the lower grooves are parallel arranged and are substantially parallel to the horizontal direction.

3. The winding structure of motor stator of claim 2, wherein a longitudinal cross-section of each of the upper grooves is recessed arc-shaped, a longitudinal cross-section of each of the lower grooves is recessed arc-shaped.

4. The winding structure of motor stator of claim 3, wherein each of the first stopping pieces at least partially overlaps at least one of the upper grooves along the horizontal direction, each of the second stopping pieces at least partially overlaps at least one of the upper grooves along the horizontal direction, each of the third stopping pieces at least partially overlaps at least one of the lower grooves along the horizontal direction, each of the fourth stopping pieces at least partially overlaps at least one of the lower grooves along the horizontal direction; two ends of each of the upper grooves obliquely extend downward to form chamfers at two ends thereof along the horizontal direction, two ends of each of the lower grooves obliquely extend upward to form chamfers at two ends thereof along the horizontal direction; the two first stopping pieces are located at an end of the first lateral wall closer to the stator core, the two second stopping pieces are located at an end of the second lateral wall closer to the stator core, the two third stopping pieces are located at an end of the third lateral wall closer to the stator core, the two fourth stopping pieces are located at an end of the fourth lateral wall closer to the stator core; a minimum distance between each of the first stopping pieces and the coil is 0.5-1.0 time a diameter of the wire, a minimum distance between each of the second stopping pieces and the coil is 0.3-0.8 time the diameter of the wire, a minimum distance between each of the third stopping pieces and the coil is 0.5-1.0 time the diameter of the wire, a minimum distance between each of the fourth stopping pieces and the coil is 0.3-0.8 time the diameter of the wire; a distance between each of the first stopping pieces and the second stopping piece corresponding to it is 12-17 times a length of each of the first stopping pieces extending from the first lateral wall, a distance between each of the first stopping pieces and the second stopping piece corresponding to it is 12-17 times a length of each of the second stopping pieces extending from the second lateral wall, a distance between each of the third stopping pieces and the fourth stopping piece corresponding to it is 12-17 times a length of each of the third stopping pieces extending from the third lateral wall, a distance between each of the third stopping pieces and the fourth stopping piece corresponding to it is 12-17 times a length of each of the fourth stopping pieces extending from the fourth lateral wall; two ends of each of the insulation members along the longitudinal direction extend to the upper cap and the lower cap respectively to be protected by the first stopping piece, the second stopping piece, the third stopping piece, and the fourth stopping piece along the horizontal direction; the upper receiving groove further has an elongated stepped groove therein, the stepped groove is formed on one of the first lateral wall and the second lateral wall, the stepped groove extends along a direction nonparallel to an extending direction of the upper grooves, a bottom of the stepped groove is higher than bottoms of the upper grooves, a longitudinal cross-section of the bottom of the stepped groove is recessed arc-shaped, a depth of the stepped groove is increasing toward the upper grooves; the coil includes two layers of the wire, the two layers of the wire extend along two nonparallel directions respectively in the upper receiving groove.

5. The winding structure of motor stator of claim 2, wherein each of the first stopping pieces at least partially overlaps at least one of the upper grooves along the horizontal direction, each of the second stopping pieces at least partially overlaps at least one of the upper grooves along the horizontal direction, each of the third stopping pieces at least partially overlaps at least one of the lower grooves along the horizontal direction, each of the fourth stopping pieces at least partially overlaps at least one of the lower grooves along the horizontal direction.

6. The winding structure of motor stator of claim 2, wherein two ends of each of the upper grooves obliquely extend downward to form chamfers at two ends thereof along the horizontal direction, two ends of each of the lower grooves obliquely extend upward to form chamfers at two ends thereof along the horizontal direction.

7. The winding structure of motor stator of claim 1, wherein the two first stopping pieces are located at an end of the first lateral wall closer to the stator core, the two second stopping pieces are located at an end of the second lateral wall closer to the stator core, the two third stopping pieces are located at an end of the third lateral wall closer to the stator core, the two fourth stopping pieces are located at an end of the fourth lateral wall closer to the stator core.

8. The winding structure of motor stator of claim 1, wherein a minimum distance between each of the first stopping pieces and the coil is 0.5-1.0 time a diameter of the wire, a minimum distance between each of the second stopping pieces and the coil is 0.3-0.8 time the diameter of the wire, a minimum distance between each of the third stopping pieces and the coil is 0.5-1.0 time the diameter of the wire, a minimum distance between each of the fourth stopping pieces and the coil is 0.3-0.8 time the diameter of the wire.

9. The winding structure of motor stator of claim 1, wherein a distance between each of the first stopping pieces and the second stopping piece corresponding to it is 12-17 times a length of each of the first stopping pieces extending from the first lateral wall, a distance between each of the first stopping pieces and the second stopping piece corresponding to it is 12-17 times a length of each of the second stopping pieces extending from the second lateral wall, a distance between each of the third stopping pieces and the fourth stopping piece corresponding to it is 12-17 times a length of each of the third stopping pieces extending from the third lateral wall, a distance between each of the third stopping pieces and the fourth stopping piece corresponding to it is 12-17 times a length of each of the fourth stopping pieces extending from the fourth lateral wall.

\* \* \* \* \*